March 18, 1930.                E. HOPKINSON                1,750,753
                                DRYING APPARATUS
                            Filed April 10, 1926        2 Sheets-Sheet 1

INVENTOR.
Ernest Hopkinson.
BY
ATTORNEY.

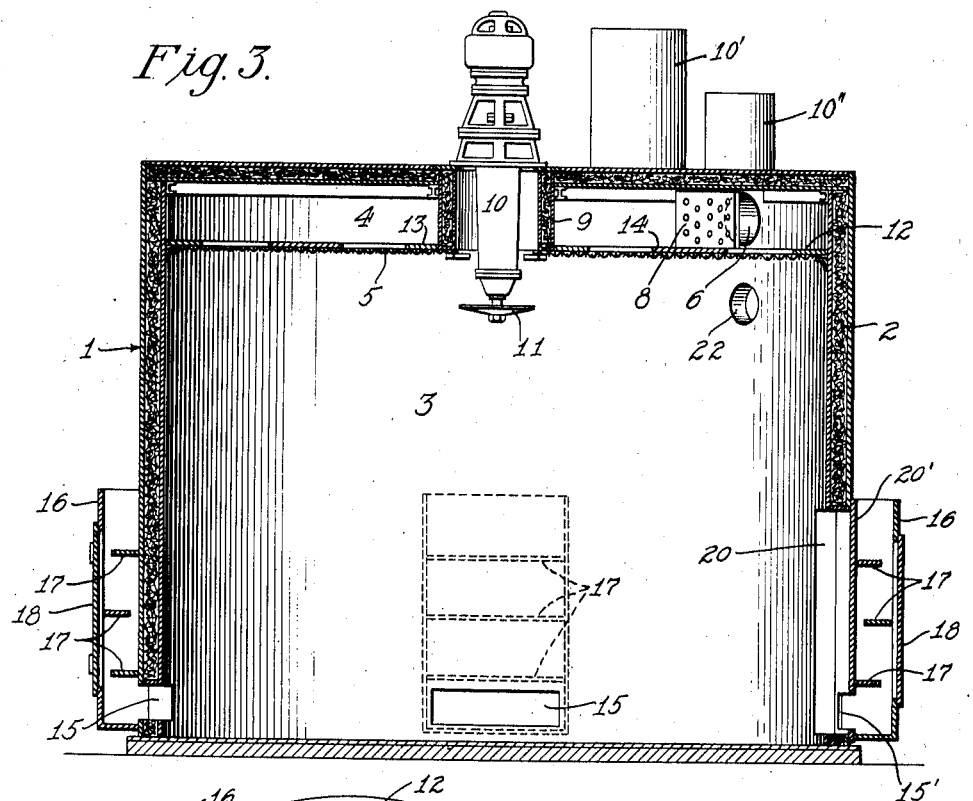

Patented Mar. 18, 1930

1,750,753

UNITED STATES PATENT OFFICE

ERNEST HOPKINSON, OF NEW YORK, N. Y., ASSIGNOR TO GENERAL RUBBER COMPANY, OF NEW YORK, N. Y., A CORPORATION OF NEW JERSEY

DRYING APPARATUS

Application filed April 10, 1926. Serial No. 101,060.

This invention relates to a drying apparatus, more particularly to an apparatus for spray drying rubber latex and other materials.

In recent years there has been an extensive development of the production of crude rubber by drying rubber latex in comminuted form while suspended in a current of heated drying medium, and compressing the dried deposit to form crude rubber. This method has many advantages such as speed, economy, production of a uniform rubber, and retention of all the solid constituents of the latex in the rubber, and the material thus produced also is of superior strength and vulcanizing qualities. Patents have been taken out for spray drying the rubber latex, but the apparatus is more particularly designed for use on a large scale.

An object of the present invention is to provide a simple, efficient and inexpensive apparatus for spray drying rubber latex.

Another object is to provide an efficient and easily varied means for distributing the drying medium in the drying chamber.

A further object is to provide a simple, easily cleaned and efficient collecting device for treatment of the exhaust gases.

The invention aims in general to produce a small, compact and easily assembled latex drying apparatus particularly adapted for use on small plantations.

Without intention to limit the invention otherwise than as is required by the prior art, the same consists broadly in a chamber of circular or approximately circular form, provided with a spraying apparatus centrally disposed therein near the top, variable means for supplying a distributed and downwardly directed current of drying medium at the top of the chamber, with means for preventing direct access of said drying medium to the side wall and sprayer, and widely distributed exhaust means adjacent the bottom of the chamber connected with collecting means providing a circuitous path for the exhaust gases.

For a detailed description of the nature and objects of the invention, reference is made to the accompanying specification and drawings, in which latter:

Fig. 2 is a horizontal section on the line 2—2 of Fig. 1; and

Fig. 3 is a vertical section on the line 3—3 of Fig. 2.

Figure 1:
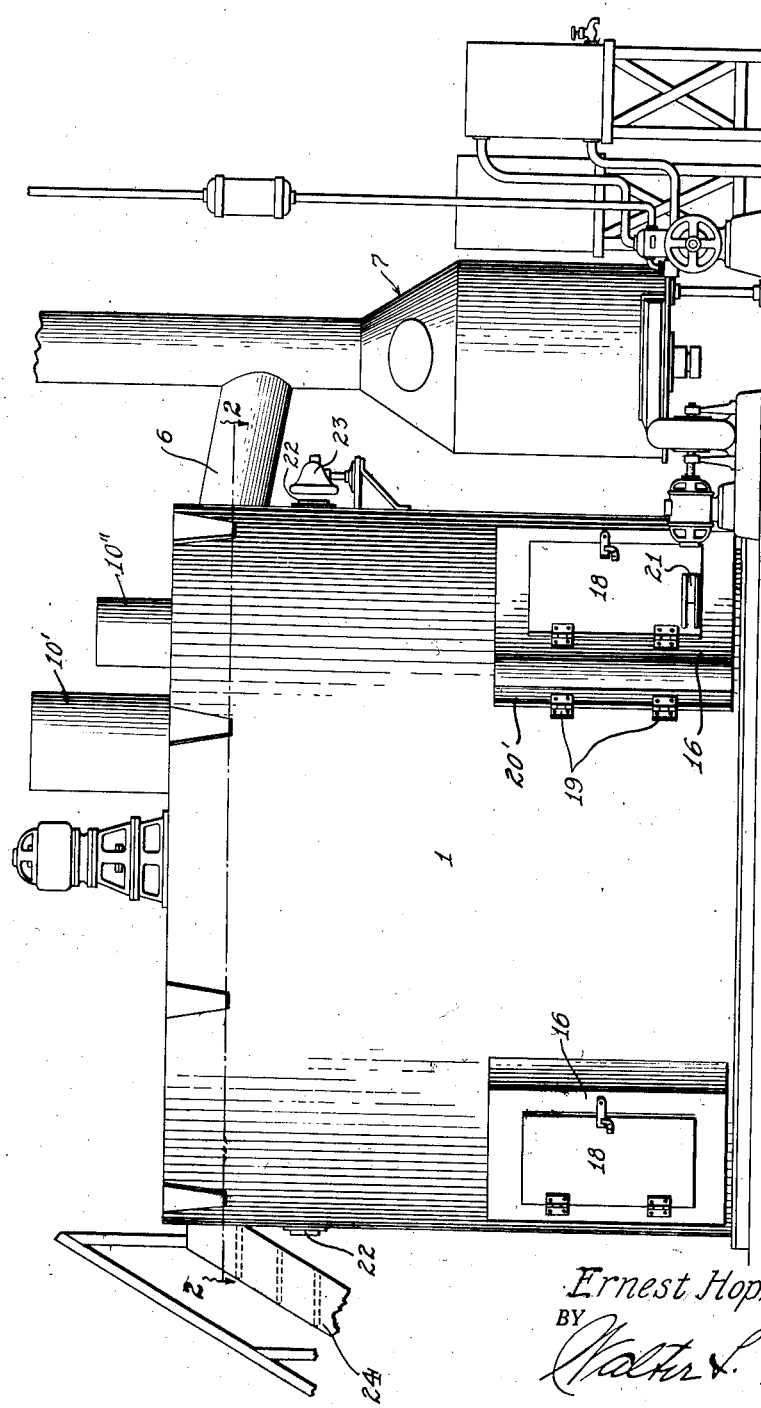
Fig. 1 is a side elevation of the drying apparatus.

Referring to the drawings, the numeral 1 designates generally the drying apparatus, the walls of which may be heat insulated in any suitable manner as shown at 2. This apparatus may be of circular or approximately circular form. The interior of the drier 1 is divided into a drying chamber 3 and an air supply and distributing chamber 4 by means of the partition 5. In the present instance the partition is formed of metallic gauze, but it is obvious that a perforated sheet may be used instead. Leading into the distributing chamber 4 is a supply pipe 6 which is connected to a furnace 7 for supplying the drying medium, such as a mixture of heated air and combustion products, and in order to more widely distribute the drying gas in the chamber 4, a curved perforated baffle 8 is disposed in front of the outlet from the pipe 6. Depending from the center of the top of the drier is a heat insulated casing 9 preferably of cylindrical form, this casing extending downwardly to the gauze 5 and providing a cylindrical opening in which is disposed the sprayer unit 10. This unit may be of any suitable form, but is preferably of the centrifugal type and is provided with a rotating sprayer disc 11 to which the latex, or other material to be dried, is supplied. In the present instance it is shown as a self-contained electrically driven one, such as that shown in patent to Coffin, No. 1,558,593, October 27, 1925, with the exception that the spray disc is slightly dished. The spray unit is furnished with any suitable connections for latex and water supplies, which are preferably carried in tanks 10′ and 10″ on the top of the drying apparatus, and the method of operation is as described in said patent.

In order to properly distribute the drying medium in the chamber, baffles are provided which may rest directly upon the gauze 5. It is essential that a direct flow of the drying air to the side wall of the drying chamber be prevented, and to accomplish this a baffle 12 may be placed upon the gauze 5 next to the side wall of the drier 1. This baffle may be formed of any desired number of pieces and it is not limited in size to the relative proportions shown in the drawings, as long as it extends inwardly from the side wall a sufficient distance to prevent the downwardly flowing current of drying medium from directly striking the side wall. It is also desirable to prevent direct access of the drying medium to the latex flowing outwardly on the disc 11, and to accomplish this result a baffle 13 is disposed upon the gauze 5 around the insulated casing 9. The opening through the gauze 5 between the baffles 12 and 13 may be partially closed off in any desired manner to distribute the downwardly flowing current of drying medium as required. In the present instance an intermediate baffle ring 14 is shown, which ring may be formed of sections of any suitable size.

Adjacent the bottom of the drying chamber a series of exhaust openings or outlets 15 is provided, which outlets are preferably symmetrically disposed around the chamber and are sufficient in number and extent to provide a large aggregate exhaust area. Communicating with each opening 15 is an exhaust box or collector 16 in the form of a casing secured to the outer wall of the drying chamber and closed at the bottom and open at the top. Extending across the interior of each casing are the staggered baffles 17, and in order to provide for the easy removal of deposits from the casing, a door 18 is disposed in its outer wall. To provide for the easy removal of the dry deposit from the floor of the drying chamber, one or more of the casings 16, instead of being fixedly connected to the wall of the drying chamber, may be hingedly connected as shown at 19 in Fig. 1. In this case, an opening 20 is cut in the wall of the drying chamber to form a doorway, and the casing 16 is provided with an inner wall 20' covering the doorway, the wall 20' being formed adjacent its bottom portion with an exhaust opening 15' corresponding to the openings 15. One or more of the doors 18 may be also provided with a small slideway 21 (Fig. 1) through which samples may be taken when desired without opening the entire door. Peep holes 22 are also provided in the side wall of the drier and a light 23 may be disposed opposite one of these peep holes for illuminating the interior of the drier. A stairway 24 is provided for ready access to the top of the drier.

In operation the furnace is started, and after the drying medium is being supplied at the proper temperature, it is diverted through pipe 6 into the supply chamber 4 at the top of the drier, and an even distribution in this chamber is secured by means of the curved perforated baffle 8. The sprayer 10 having been started, the latex is thrown off from the disc 11 in an umbrella shaped spray, and by properly proportioning the disc and the diameter and height of the drying chamber and regulating the speed of the disc, this spray will not contact with the side wall of the drying chamber but will closely approach it adjacent the bottom. By reason of the baffle 12, the downwardly directed current of drying medium cannot directly strike the side wall of the drying chamber but impinges on the expanding and descending spray of latex. The baffle 13 prevents direct contact of the drying medium with the spraying disc so that the current of drying air does not strike the sprayed latex until shortly after it has left the spraying disc. By varying the size and arrangement of the intermediate baffle 14 any suitable distribution of the drying medium may be obtained. By properly regulating the temperature and speed of the drying gases and properly proportioning the number and size of the exhaust outlets 15, almost the entire quantity of dried material will deposite on the bottom of the drying chamber. As the exhaust gases flow outwardly through the openings 15 and casings 16, the staggered baffles 17 cause the gases to pursue a tortuous upward path before exhausting from the top of the casings 16, and as a result there is a very efficient recovery of any fine dried particles which have not deposited on the bottom of the drying chamber. When it is desired to remove accumulated deposits from the exhaust boxes or casings 16, this can readily be done by opening the doors 18 in the casings. When a sufficient quantity of dried material has accumulated on the floor of the drying chamber the one or more casings 16 which are hingedly mounted, may be opened and the operatives may then remove the deposit of dried latex through the doorway 20. This spongy deposit, which resembles fine textured sponge cake in appearance, may then be placed in a press and compacted to form crude rubber.

By my invention there has been provided a small, compact, easily assembled, economically and easily operated drying apparatus, which is particularly suited for use on small plantations where the quantity of latex is insufficient to permit the use of a large drying apparatus which ordinarily is most economically operated when run continuously.

With the above detailed disclosure in mind, it is obvious that numerous modifications will suggest themselves to those skilled in the art and it is not desired to limit the invention otherwise than as set forth in the appended claims.

Having thus described my invention, what

I claim and desire to protect by Letters Patent is:—

1. In an apparatus for drying latex and similar material, a drying chamber, a disk sprayer centrally disposed adjacent the top thereof, a supply chamber for a drying medium above the drying chamber, a perforate screen separating the chambers, imperforate means disposed on said screen to define an annular opening adjacent but offset from said sprayer and a second annular opening of greater diameter spaced from the side wall, and equidistant exhaust openings of large aggregate area in the side wall adjacent the bottom of the drying chamber.

2. In an apparatus for drying latex and similar material, a drying chamber, a disk sprayer centrally disposed adjacent the top thereof, means for supplying spaced downwardly directed currents of drying medium in annular form at points adjacent the sprayer and spaced from the side wall of the chamber, a plurality of equidistant exhaust openings in the side wall adjacent the bottom of the chamber, and exhaust boxes disposed around the outside of the drying chamber and communicating with said openings, one of said boxes being hingedly mounted and forming a doorway to the drying chamber.

3. In an apparatus for drying latex and similar material, a circular drying chamber, a supply chamber for a drying medium above the same, a perforate screen between the two, a disk sprayer centrally located in the upper part of the drying chamber, imperforate means of annular form disposed on said screen next to the side wall, additional imperforate annular means disposed on the screen in spaced relation to said first annular means, and a plurality of equidistant exhaust openings of large aggregate area disposed in the side wall at the bottom of the chamber.

4. In an apparatus for drying latex and similar material, a circular drying chamber, a supply chamber for a drying medium above the same, a perforate screen between the two, a disk sprayer centrally located in the upper part of the drying chamber, imperforate means disposed on said screen for preventing direct access of the drying medium to the surface of the disk, imperforate means disposed on said screen adjacent the side wall for preventing direct access of the drying medium to said wall adjacent the top of the chamber, an inlet for the drying medium to said supply chamber, a baffle for distributing the drying medium in the supply chamber, and exhaust outlets at the bottom of the drying chamber.

5. In an apparatus for drying latex, an enclosing wall having a closed top, a well depending centrally from said top, a disk spraying device extending through said well and closing the top thereof, the spraying disk being below the well, a screen extending from said well to the wall and defining an upper drying medium supply chamber and a lower drying chamber, means on said screen for preventing direct access of the drying medium from the supply chamber to the wall at the upper portion of the drying chamber, means for preventing direct access of the drying medium to the spraying disc, and exhaust means adjacent the bottom of the enclosing wall.

Signed at New York city, county of New York, and State of New York, this 29th day of March, 1926.

ERNEST HOPKINSON.